United States Patent
Hamm

(10) Patent No.: US 8,466,434 B2
(45) Date of Patent: Jun. 18, 2013

(54) AIRCRAFT POTABLE WATER SYSTEM

(75) Inventor: Richard Hamm, Akron, OH (US)

(73) Assignee: Goodrich Corporation, Charlotte, NC (US)

(*) Notice: Subject to any disclaimer, the term of this patent is extended or adjusted under 35 U.S.C. 154(b) by 78 days.

(21) Appl. No.: 13/253,124

(22) Filed: Oct. 5, 2011

(65) Prior Publication Data

US 2012/0104275 A1 May 3, 2012

Related U.S. Application Data

(60) Provisional application No. 61/409,457, filed on Nov. 2, 2010.

(51) Int. Cl.
*B65B 55/08* (2006.01)

(52) U.S. Cl.
CPC ........................... *B65B 55/08* (2013.01)
USPC ........................ 250/455.11; 422/24

(58) Field of Classification Search
USPC .............. 250/455.11, 435, 432 R; 422/24, 422/22
See application file for complete search history.

(56) References Cited

U.S. PATENT DOCUMENTS

| | | | |
|---|---|---|---|
| 5,194,723 A | 3/1993 | Cates et al. | |
| 5,204,517 A | 4/1993 | Cates et al. | |
| 5,281,798 A | 1/1994 | Hamm et al. | |
| 5,328,517 A | 7/1994 | Cates et al. | |
| 5,512,123 A | 4/1996 | Cates et al. | |
| 5,613,509 A | 3/1997 | Kolb et al. | |
| 5,630,915 A * | 5/1997 | Greene et al. | 204/164 |
| 5,768,853 A | 6/1998 | Bushnell et al. | |
| 5,782,253 A | 7/1998 | Cates et al. | |
| 5,900,211 A | 5/1999 | Dunn et al. | |
| 6,013,918 A | 1/2000 | Bushnell et al. | |
| 6,117,335 A | 9/2000 | Bender | |
| 6,200,466 B1 | 3/2001 | Bender | |
| 6,228,332 B1 | 5/2001 | Dunn et al. | |
| 6,264,836 B1 | 7/2001 | Lantis | |
| 6,433,344 B1 | 8/2002 | Salisbury et al. | |
| 6,454,952 B1 | 9/2002 | Thorpe | |
| 6,463,956 B2 | 10/2002 | Walker | |
| 6,766,822 B2 | 7/2004 | Walker | |
| 6,867,547 B2 | 3/2005 | Dunisch | |

(Continued)

FOREIGN PATENT DOCUMENTS

DE 102008051239 A1 4/2010
WO WO0129535 A1 4/2001

OTHER PUBLICATIONS

Extended European Search Report for EP 11 25 0843; (Feb. 22, 2012).
A Linear Ultraviolet Flashlamp With Self-Replenishing Cathode Author Alex Wekhof 8127 Review of Scientific Instruments 53 (Dec. 1992) pp. 5565-5569.

*Primary Examiner* — Kiet T Nguyen
(74) *Attorney, Agent, or Firm* — Cantor Colburn LLP

(57) ABSTRACT

A water purification device (30) is provided for installation in an aircraft potable water system. The device (30) comprises a treatment cell (40) incorporated into the water system's plumbing and a flashlamp (50) positioned to productively transmit into the treatment chamber (41) of the cell (40). The flashlamp (50) emits short-pulse and high-intensity flashes, thereby delivering adequate UV doses (e.g., at least 40 mJ/cm$^2$) with reasonable input power (e.g., 400 watts) for an aircraft system.

20 Claims, 4 Drawing Sheets

U.S. PATENT DOCUMENTS

| | | |
|---|---|---|
| 6,951,617 B2 | 10/2005 | Fries et al. |
| 2002/0033369 A1 | 3/2002 | Bender |
| 2002/0144955 A1* | 10/2002 | Barak et al. .................. 210/748 |
| 2005/0056597 A1 | 3/2005 | Fries et al. |
| 2006/0228251 A1 | 10/2006 | Schneberger et al. |
| 2007/0131872 A1 | 6/2007 | Shearer et al. |
| 2010/0090840 A1 | 4/2010 | Schreiner |
| 2010/0133155 A1 | 6/2010 | Nolan |

* cited by examiner

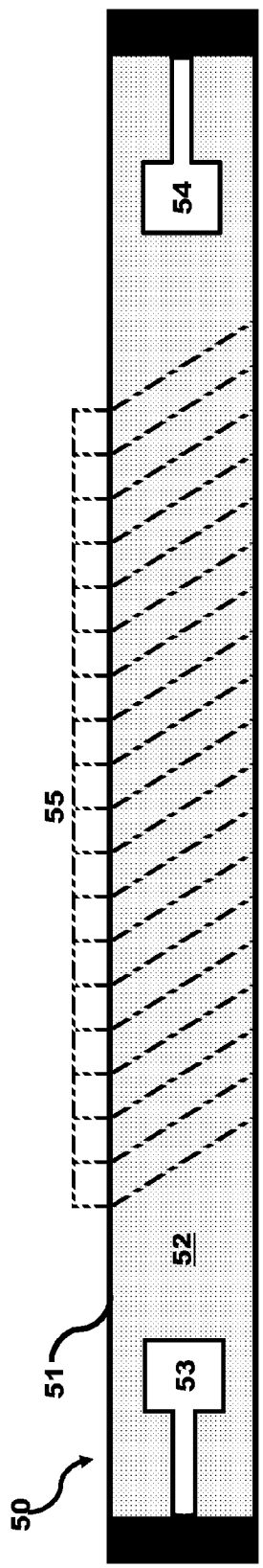
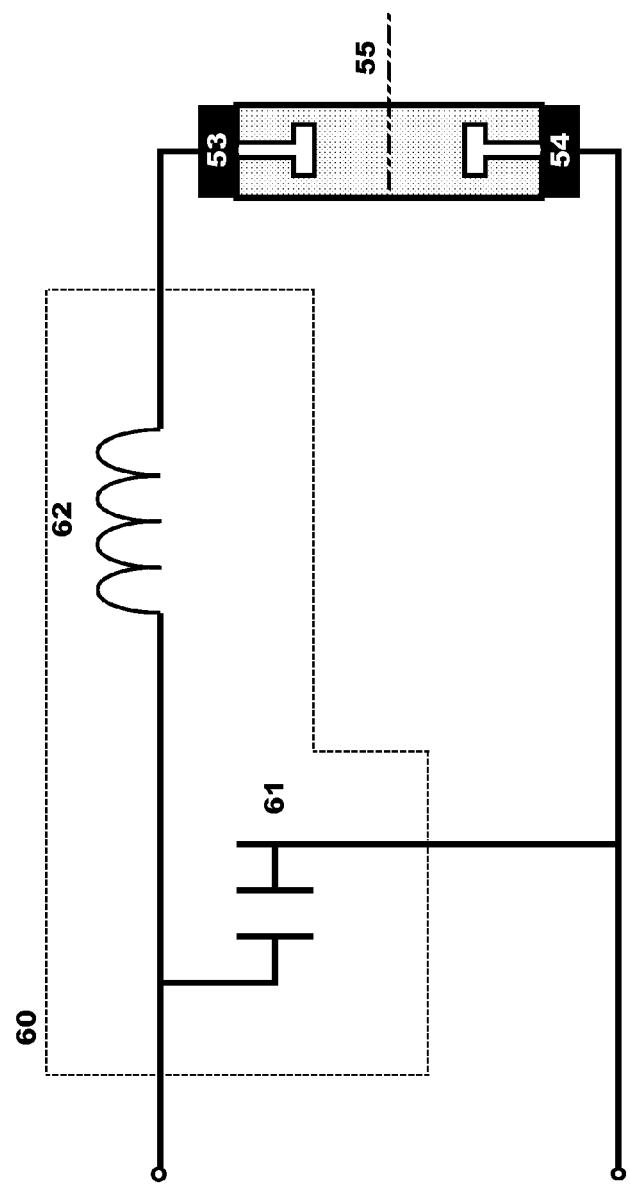
FIGURE 3
FIGURE 4 ical AIRCRAFT POTABLE WATER SYSTEM

RELATED APPLICATION

This application claims priority under 35 USC §119(e) to U.S. Provisional Patent Application No. 61/409,457 filed on Nov. 2, 2010. The entire disclosure of this provisional patent application is hereby incorporated by reference.

BACKGROUND

An aircraft potable water system typically supplies water to cabin outlet facilities for selective dispensing therefrom. The dispensed liquid is used by passengers and crew for purposes calling for purified water. These uses can include, for example, washing, drinking, cooking, coffee brewing, and/or ice making. The system can integrate a UV device to ensure that the water is properly purified. According to the National Sanitation Foundation International, a minimum UV dose of 40 mJ/cm$^2$ is required to acceptably deactivate pathogens.

SUMMARY

A purification device for an aircraft potable water system is provided. In this water purification device, a flashlamp emits short-pulse and high-power UV flashes to water passing through a treatment chamber. The device can be constructed compactly, lightly, and to have a useful life exceeding well beyond 1000 flights.

DRAWINGS

FIGS. 3-4 show a flashlamp and a pulse formation network of the water purification device.

DESCRIPTION

Figure 1:
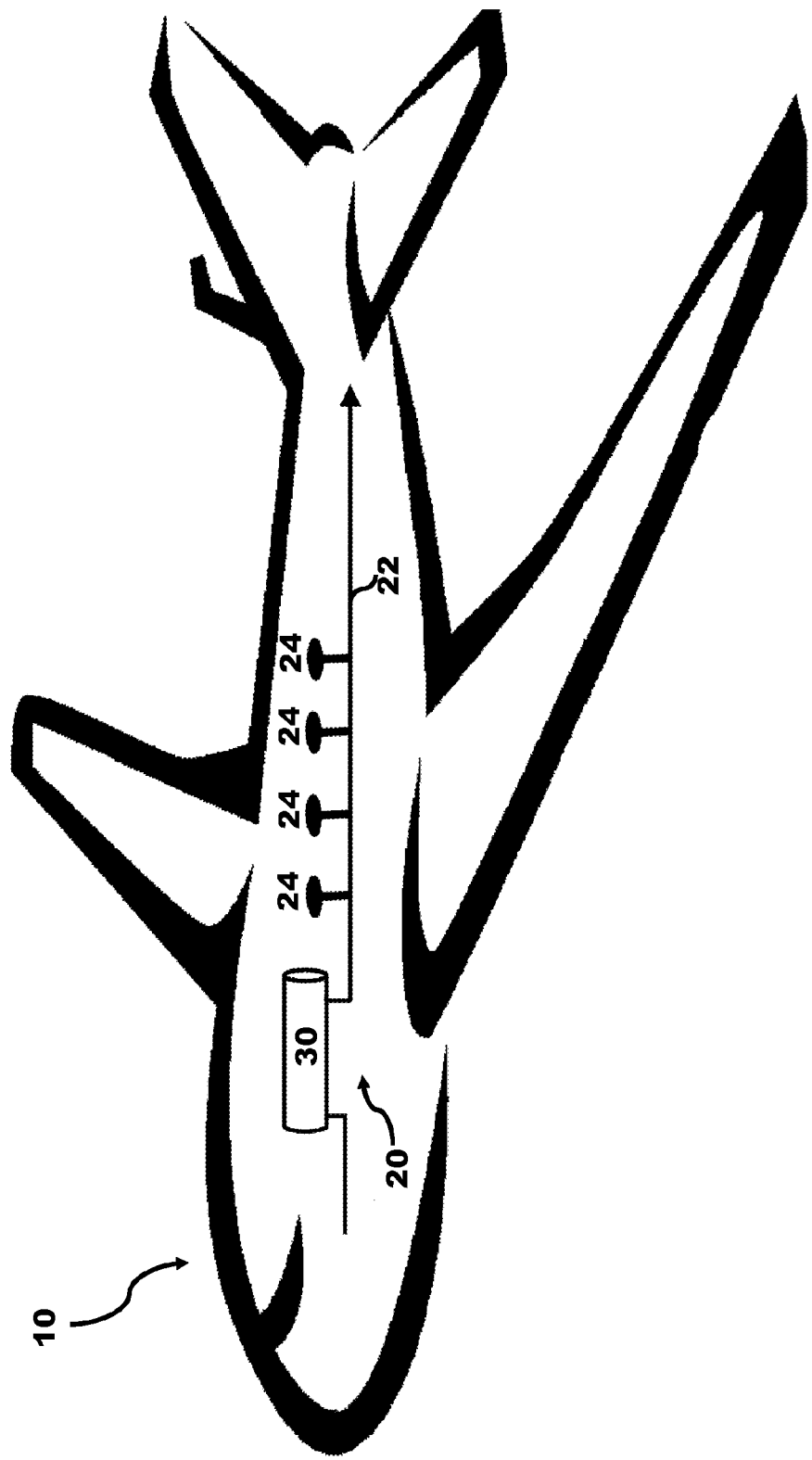
FIG. 1 shows an aircraft with a potable water system installed thereon, the potable water system having a purification device incorporated into its plumbing.

Referring now to the drawings, and initially to FIG. 1, an aircraft 10 with a potable water system 20 is shown. The system 20 includes plumbing 22 that supplies water to outlet facilities 24 for selective dispensing therefrom. Passengers and crew can selectively dispense potable water from the outlet facilities 24 for purposes such as showering, drinking, cooking, dish washing, coffee brewing, and/or ice making.

The aircraft potable water system 20 further includes a device 30 to ensure that the water dispensed from the facilities 24 is properly purified. The location of the purification device 30 relative to the supply plumbing 22 can be selected to optimize pathogen-deactivation purposes while also being compatible with installation, inspection and maintenance. As such, various placements of the purification device 30 within the potable water system 20 are probable and presumed.

Figure 2:
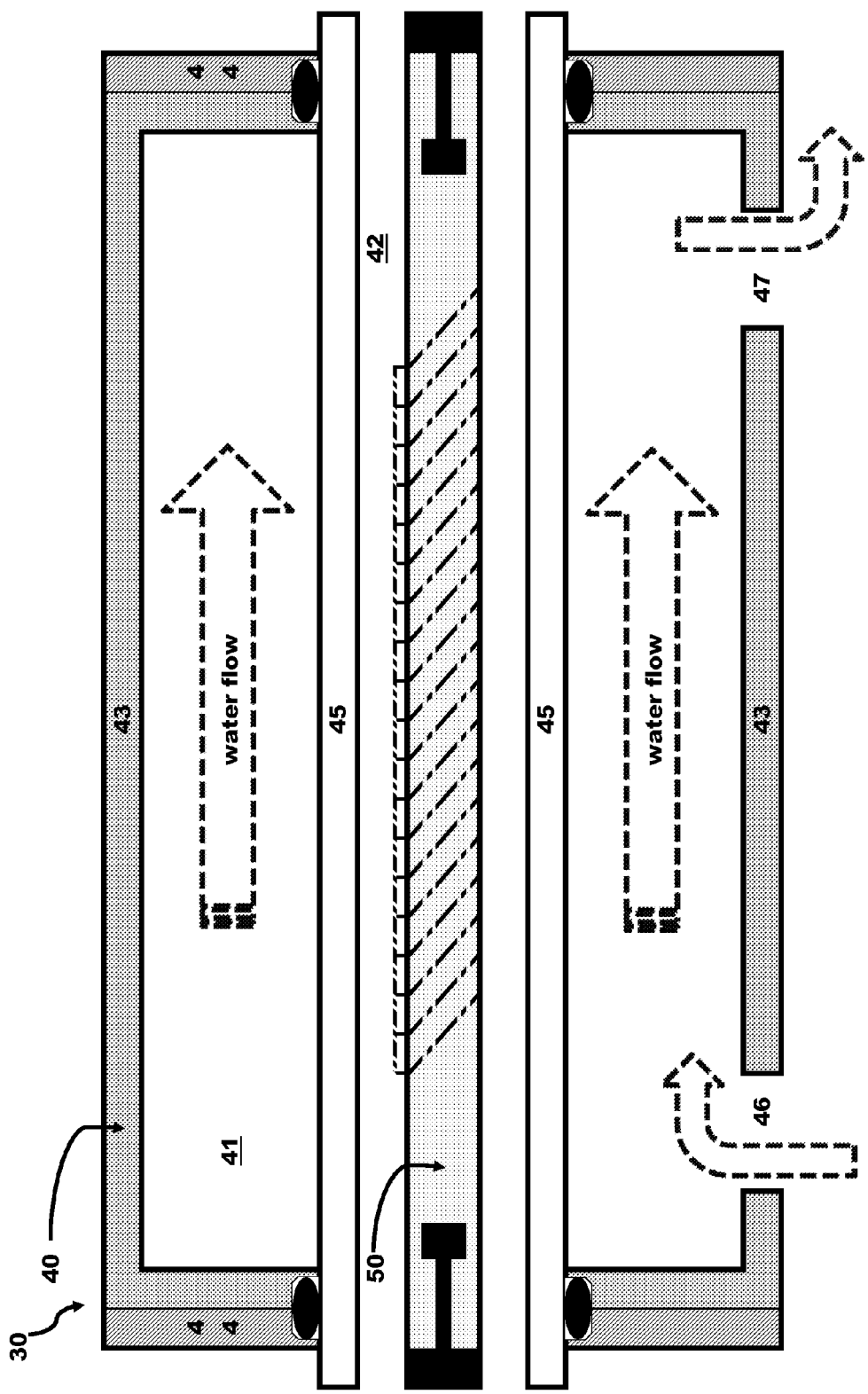
FIG. 2 shows the purification device.

Referring now to FIG. 2, the purification device 30 comprises a treatment cell 40 and a UV flashlamp 50. The treatment cell 40 forms an annular chamber 41 and a hollow corridor 42 surrounded by the chamber 41. The cell 40 can have an exterior wall 43 and end walls 44 made of a suitable UV-opaque material (e.g., stainless steel). The cell's interior wall 45 can be made of a UV-transmissive material (e.g., quartz). Water enters the chamber 41 through an inlet 46 and exits the chamber 41 through an outlet 47.

The flashlamp 50 extends through the chamber's corridor 42 whereby UV rays emitted thereby are transmitted through the cell's interior wall 45 to the water contained with the chamber 41. As is best seen by looking additionally at FIG. 3, the flashlamp 50 can comprise a UV-transmissive envelope 51, a noble gas 52 within the envelope 51, an anode 53, a cathode 54, and a trigger electrode 55. The gas 52 is selected so as to emit polychromatic UV light. Xenon is usually considered the favored gas candidate in flashlamp applications because of its relatively high conversion efficiency. That being said, neon, argon, and krypton may also be suitable contenders in certain situations.

Figure 5:
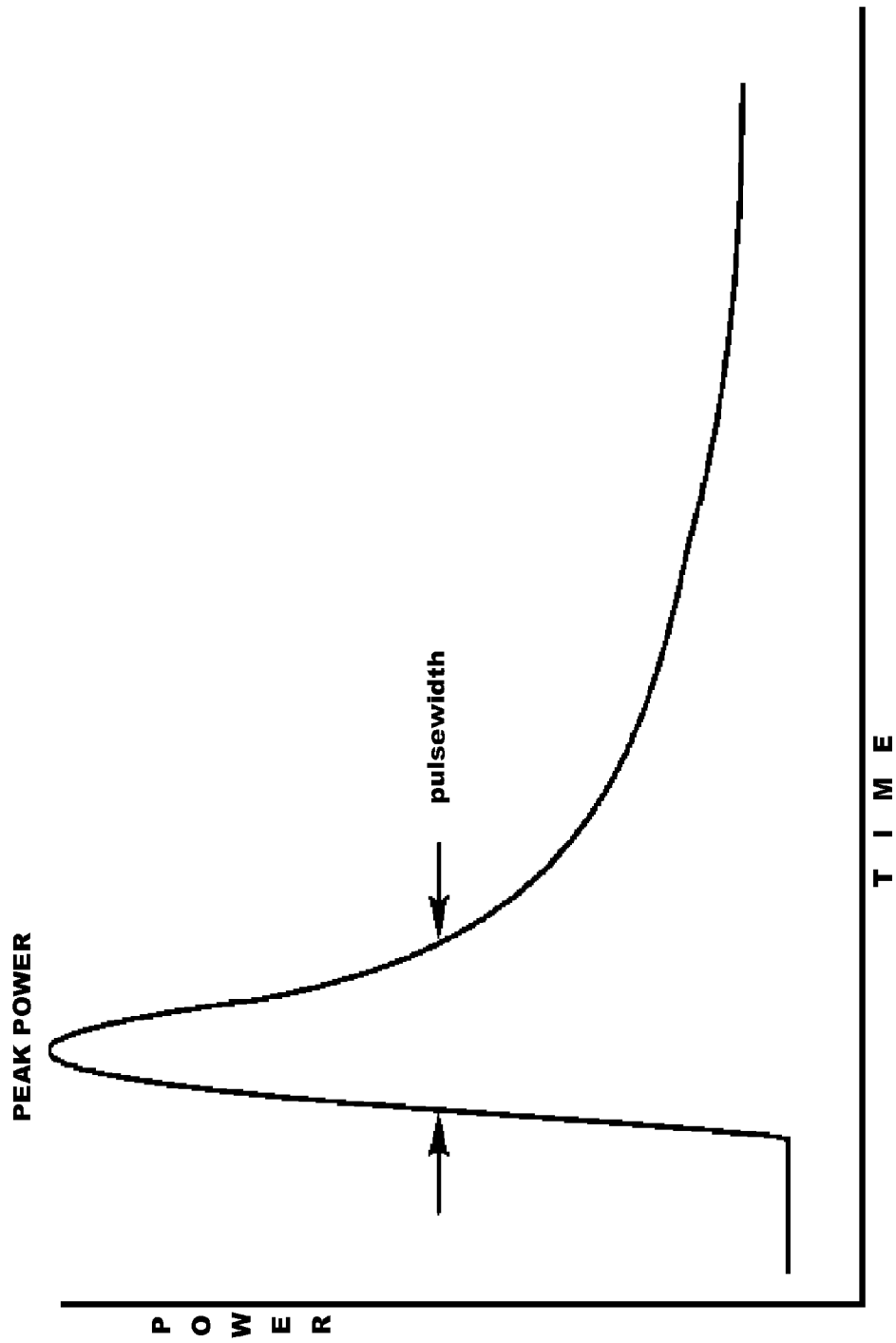
FIG. 5 is a graph of a short-duration and high-power pulse produced by the water purification device.

The purification device 30 further comprises a pulse formation network 60 such as is shown in FIG. 4. The network 60, in its simplest form, can comprise a capacitor 61 and an inductor 62 connected in series with the flashlamp 50. The pulse formation network 60 is architected so as to release electrical energy to the flashlamp 50 in the form of high-energy and short-duration pulses. As is graphed in FIG. 5, each pulse has a narrow width and extremely tall peak power.

The chamber 41 can have a volume of between 1000 cm$^3$ and 2000 cm$^3$, 1200 cm$^3$ and 1800 cm$^3$, and/or 1400 cm$^3$ and 1600 cm$^3$. Additionally or alternatively, the chamber 41 can be sized to provide a through pace of between 200 cm$^3$/sec and 300 cm$^3$/sec, between 220 cm$^3$/sec and 280 cm$^3$, and/or between 240 cm$^3$/sec and 260 cm$^3$/sec, and/or to provide a dwell time of 2 seconds to 10 seconds, 4 seconds to 8 seconds, and/or 5 seconds to 7 seconds.

With the illustrated annular geometry, for example, an outer diameter of 100 mm and an inner diameter of 16 mm would result in a pace and dwell time within these ranges for a potable water system having a flow rate of approximately 4 gallons per minute or 15 liters per minute.

The flashlamp 50 can have a cross voltage of between 2000 and 4000 volts, between 2500 and 3500 volts, and/or between 2800 and 3200 volts, a discharge current of between 700 and 1500 amps, between 800 and 1300 amps, and/or between 900 and 1200 amps, and/or impedance parameter of between 30 and 70 ohms$^{1/2}$amp$^{1/2}$, between 40 and 60 ohms$^{1/2}$amp$^{1/2}$, and/or between 45 and 55 ohms$^{1/2}$amp$^{1/2}$. These voltages, currents, and parameters can be reached with a Xenon flashlamp having 5 mm diameter, an arc length of 200 mm, a fill pressure of 450 torr, and a plasma resistivity of 0.015 ohms.

With such a lamp, the water purification device 20 can be constructed compactly and/or lightly. Specifically, for example, the device 20 can occupy less than two cubic feet and/or less than one cubic meter. Additionally or alternatively, the water purification device 20 can weigh less than twenty pounds and/or less than ten kilograms.

The pulse formation network 60 can be constructed to provide pulse widths of between 5 and 15 microseconds (e.g., less than 20 microseconds, less than 18 microseconds, less than 16 microseconds, less than 19 microseconds, etc.) and/or provide between 10 and 30 flashes per second (e.g., at least 5 flashes per second, at least 7 flashes per second, at least 10 flashes per second, etc.)

The pulse formation network can also be constructed to provide peak power outputs between 20000 Watts and 30000 Watts (e.g., greater than 10000 Watts, greater than 20000 Watts, greater than 25000 Watts, greater than 28000 Watts, greater than 29000 Watts, etc.). Such high power outputs can correspond to extremely high peak plasma temperatures, such as over 7000° K, over 8000° K, and/or over 9000° K. This can be accomplished with an input voltage of 2950 volts, a total circuit inductance of 4.96 micro Henries, and capacitance of 4.75 microfarads.

Although the aircraft 10, the potable water system 20, the purification device 30, the chamber 40, the flashlamp 50, and/or the pulse formation network 60, have been shown and described with respect to a certain embodiment or embodiments, it is obvious that equivalent alterations and modifications will occur to others skilled in the art upon the reading and understanding of this specification and the annexed drawings.

The invention claimed is:

1. An aircraft potable water system comprising at least one outlet facility, plumbing supplying water to the outlet facility, and a water-purification device incorporated into the plumbing, wherein said water-purification device comprises:
    a treatment chamber sized to provide a through pace of between 200 cm$^3$/sec and 300 cm$^3$/sec;
    a flashlamp transmitting polychromatic UV light into the treatment chamber; and
    a pulse formation network causing the flashlamp to project polychromatic UV light flashes having durations less than 20 microseconds and peak power outputs of over 10000 Watts.

2. An aircraft potable water system as set forth in claim 1, wherein the water receives a cumulative UV dose of at least 40 mJ/cm$^2$.

3. An aircraft potable water system as set forth in claim 1, wherein polychromatic UV light has wavelengths between 235 nm and 300 nm.

4. An aircraft potable water system as set forth in claim 1, wherein the treatment chamber provides a dwell time of 2 seconds to 10 seconds.

5. An aircraft potable water system as set forth in claim 1, wherein the treatment chamber has an annular shape and surrounds a corridor, and wherein the flashlamp extends through this corridor.

6. An aircraft potable water system as set forth in claim 1, wherein the flashlamp has a cross voltage of between 2000 and 4000 volts.

7. An aircraft potable water system as set forth in claim 1, wherein the flashlamp has a discharge current of between 700 and 1500 amps.

8. An aircraft potable water system as set forth in claim 1, wherein the flashlamp has an impedance parameter of between 30 and 70 ohms$^{1/2}$amp$^{1/2}$.

9. An aircraft potable water system as set forth in claim 1, wherein the pulse formation network causes the flashlamp to project polychromatic UV light flashes having durations less than 18 microseconds.

10. An aircraft potable water system as set forth in claim 1, wherein the pulse formation network causes the flashlamp to project polychromatic UV light flashes at a frequency of at least 5 flashes per second and/or at a frequency of at less than 40 flashes per second.

11. An aircraft potable water system as set forth in claim 1 wherein the pulse formation network causes the flashlamp to provide between 10 and 30 flashes per second.

12. An aircraft potable water system as set forth in claim 1, wherein the pulse formation network causes the flashlamp to project polychromatic UV light flashes having peak power outputs of over 20000 Watts.

13. An aircraft potable water system as set forth in claim 1, wherein the pulse formation network provides a peak plasma temperature of over 7000° K.

14. An aircraft potable water system as set forth in claim 1, wherein the water receives a cumulative UV dose of at least 40 mJ/cm$^2$ and wherein the pulse formation network causes the flashlamp to project polychromatic UV light flashes having wavelengths between 235 nm and 300 nm, having durations between 5 and 15 microseconds, and having peak power outputs over 20000 Watts.

15. An aircraft potable water system as set forth in claim 1, wherein the water receives a cumulative UV dose of at least 40 mJ/cm$^2$ and wherein the pulse formation network causes the flashlamp to project polychromatic UV light flashes having wavelengths between 235 nm and 300 nm, having durations between 5 and 15 microseconds, and having peak power outputs over 28000 Watts.

16. An aircraft potable water system as set forth in claim 1, wherein the water receives a cumulative UV dose of at least 40 mJ/cm$^2$ and wherein the pulse formation network causes the flashlamp to project polychromatic UV light flashes having wavelengths between 235 nm and 300 nm, having durations between 5 and 15 microseconds, and having peak power outputs between 20000 Watts and 30000 Watts.

17. An aircraft having the potable water system set forth in claim 1 installed therein.

18. An aircraft potable water system as set forth in claim 1, wherein the treatment chamber is sized to provide a through pace of between 220 cm$^3$/sec and 280 cm$^3$/sec.

19. An aircraft potable water system as set forth in claim 18, wherein the treatment chamber is sized to provide a through pace of between 240 cm$^3$/sec and 260 cm$^3$/sec.

20. An aircraft potable water system as set forth in claim 1, wherein the treatment chamber is sized to provide a dwell time of 2 seconds to 10 seconds.

* * * * *